Feb. 6, 1945.  J. F. O'BRIEN  2,368,676
COMPOSITE ELECTRICITY CONDUCTOR UNIT
Original Filed Feb. 6, 1940
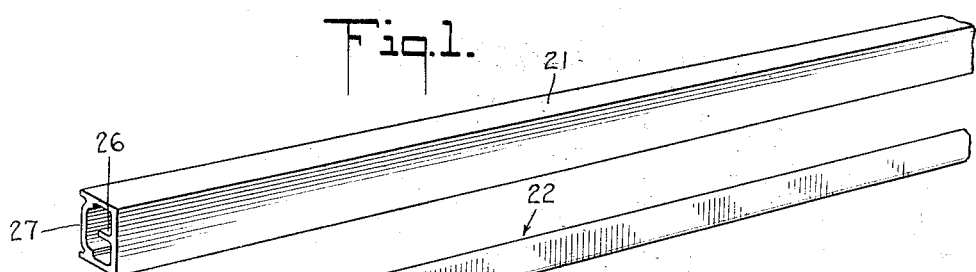
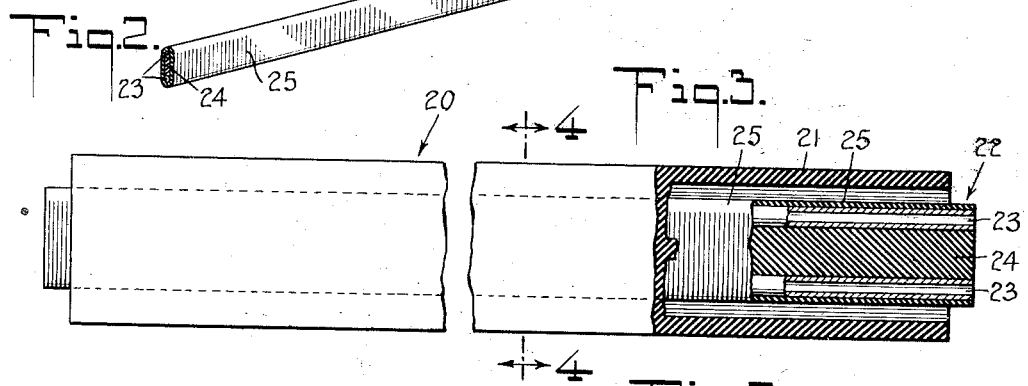
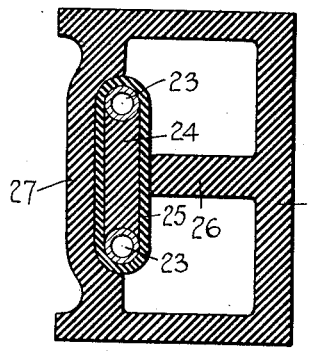
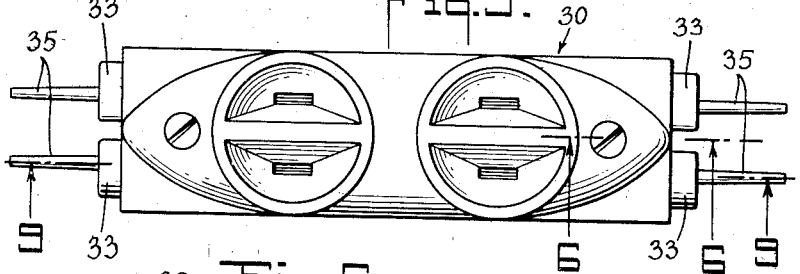
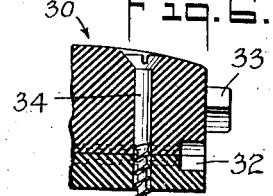
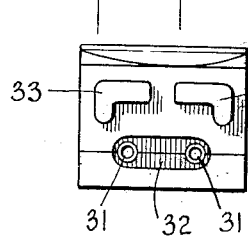
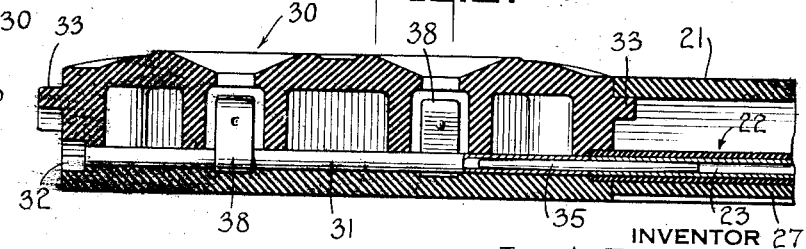
INVENTOR
Joseph F. O'Brien
BY
Henry J. Lucke
HIS ATTORNEY Patented Feb. 6, 1945

2,368,676

UNITED STATES PATENT OFFICE 2,368,676

COMPOSITE ELECTRICITY CONDUCTOR
UNIT

Joseph F. O'Brien, Jersey City, N. J., assignor to John B. Pierce Foundation, New York, N. Y., a corporation of New York Original application February 6, 1940, Serial No. 317,480. Divided and this application September 13, 1941, Serial No. 410,675

6 Claims. (Cl. 174—97)

This invention relates to improved electrical wiring systems.

In particular, the invention relates to improved electrical wiring systems comprising conductor carrying "run" units for installation in seriatim electrical and mechanical relationship, desirably through the agency of intermediate "connector" units, which latter units may embody outlet means, affording provision for the connection of electrical attachments thereto.

Further, the invention relates to improved electric wiring systems arranged for exposed installation, as contrasted to conventional concealed wiring installations in which the electric conductors are run in BX cable or the like within the wall of a building or room partitions thereof.

Among the objects of the invention are: to provide an improved electrical wiring system, aforesaid, in which the conductor units may be employed as a part of the structural trim of the building, as by disposition at, or attachment to, the baseboard or other structural building trim; to provide an improved electric wiring system comprising conductor units of composite nature, in which a conductor containing insulated core unit is housed within an outer shell unit of molded plastic, metal, or other suitable material affording the desired configuration and decorative effect. Such conductor-containing core unit embodies electrical conductors in uniformly spaced and electrically insulated status; to provide a composite conductor unit as aforesaid, of which the outer or shell unit may be formed by manufacturing processes including molding, extruding, or the like; and to provide an electrical wiring system in which the conductor carrying units and the units affording seriatim mechanical and electrical connection thereof embody means whereby the joints of such interconnected units may be "broken" and protected to preclude any possibility of accidental contact with the conductors thereof, as by the insertion of a knife blade, wire, or like relatively thin metallic element into such composite unit at the points of juncture thereof.

In the present invention, the conductor carrying unit may embody an outer shell member, as aforesaid, within which shell member are disposed channel means, tracks, or the like arranged to slidably receive, and uniformly position, a conductor containing core element. Desirably, such outer shell units are of standard length, and for operative association with such standard length units, the conductor bearing core units may project suitably from each end of the outer shell unit.

For purposes of interconnection of the conductors of successive core units, there may be employed connector units embodying outlet means if desired, and having, in the end walls thereof, sockets for the reception of the projecting ends of the core units. Electrically conductive pins or equivalent may be employed to interconnect the conductors within the connector units with the conductors within the core unit. To accurately position the shell units with relation to the connector units, and to afford protection of the interconnected unit at the joint, each connector unit may be provided, at each end thereof, with an extending lug, rib, or the like, such lug being so positioned with respect to the outer wall surfaces of the connector element as to interfit with, and accurately engage, the inner wall surfaces of the outer shell of the conductor unit, to effect a juncture thereof substantially without visible break, thus achieving effectual visual continuity of the assembled units.

This application is a division of my presently co-pending application Serial No. 317,480, filed February 6, 1940, issued as Patent No. 2,292,395 on August 11, 1942, and entitled Composite electricity conductor unit.

Other features and advantages will hereinafter appear.

In the drawing:

Fig. 1 is a perspective of a form of housing element of an improved conductor unit pursuant to the present invention;

Fig. 2 is a perspective of a conductor-containing core element for use with such housing element;

Fig. 3 is an elevation, partly in section, of an assembled conductor unit, illustrating the operative association of the conductor core element and housing element;

Fig. 4 is a transverse section taken through the assembled conductor unit of Fig. 3 at the line 4—4 thereof;

Fig. 5 is a plan view of a connector unit adapted for seriatim electrical and mechanical interconnection with the conductor units of Fig. 3, such connector unit having provisions for attachment plug connection with the conductors thereof;

Fig. 6 is a fragmentary section taken through 6—6 of the connector unit of Fig. 5;

Fig. 7 represents a connector pin for interconnecting the tubular conductors of the conductor unit and connector unit;

Fig. 8 is an end elevation of the connector unit of Fig. 5; and

Fig. 9 is a sectional elevation of the connector unit of Fig. 5, taken on line 9—9 of such figure, and showing, in section, a conductor unit interconnected therewith.

Referring first to Fig. 3, the improved connector unit 20 comprises an outer housing element 21 and a conductor-provided core element 22, the latter being arranged for slidable insertion and uniform positioning within such housing element 21. Core element 22 may desirably embody tubular electric conductors 23, 23, maintained in uniformly spaced insulated relationship by means of a spine 24, of rubber, molded plastic, or other suitable insulation material, and externally insulated by any suitable means, such as an envelope 25 of braided fibre glass or the like.

Housing element 21 may be of moldable plastic material or other suitable substantially non-resilient substance, either of insulating or non-insulating character, adaptable for molding or extrusion. Preferably, although not necessarily, housing element 21 is an imperforate-walled tube, formed in any desired standard length consonant with adaptability of the wiring system to be secured to wall studding spaced sixteen (16) inches on centers.

Referring to Fig. 4, housing element 21 is provided with a centrally disposed flange 26, and for operative association therewith, the back wall 27, as indicated, may have a longitudinally disposed channel or trackway of a dimension suitable to snugly and slidably accommodate conductor-provided core element 22. It will be observed that the flange 26 is less in width than the wall 27 whereby open cooling spaces are provided above and below the flange 26 and about the free, i. e. uncovered, surfaces of the conductor unit 22.

To afford complete protection of core element 22, rear wall 27 of housing element 21 is desirably imperforate, although it will be apparent that such wall may have a longitudinal centrally disposed slot, should such configuration be desired to effect manufacturing economies.

Flange 26 bears against core 22 for substantially the entire length thereof when such core unit is in operative, i. e., Fig. 4, position, and thus the cooperation of flange 26 with rear wall 27, taken in view of channel configuration of such rear wall, accurately positions the core within the housing unit, and frictionally holds the same against accidental displacement.

As is shown in Fig. 3, the end walls of the housing element 21 are desirably square; core element 22 is of suitable length to project beyond the end surfaces of housing 21. Desirably, the extent of projection is of the order of three-sixteenths (3/16) of an inch, at each end.

The uniformity of cross section of housing element 21, and the uniformity of cross section, conductor location and positioning of core element 22, afford the shortening of an initially standard unit as desired, merely by slidably displacing the core 22 within the housing element 21 at a distance greater than the amount to be cut from the housing element, and then cutting the required amount from such housing element with a mitre saw or like tool affording a clean sharp cut, and subsequently cutting an equal amount from the core unit. Upon repositioning the core unit within housing 21, the conductor unit 20 is ready for seriatim interconnection, as presently described.

For interconnection of conductor units 20, I provide connector units, which may be either of the outlet-provided type shown in Fig. 5 or non-outlet provided.

Referring to Figs. 5 and 9, the body of connector unit 30 may be formed from moldable plastic or other suitable material. Within such body are positioned a pair of tubular electricity conductors 31, 31, spaced and arranged to insure registry with the conductors 23, 23 of a conductor unit 20. As appears from Figs. 8 and 9, the connector unit 30, at each end thereof, has a socket 32 into which the core units 22 fit, snugly, with conductors 23, 23, thereof in registry with conductors 31, 31, of connector 30. Such interfitting relation is illustrated in Fig. 9. Electrical and mechanical interconnection of the respective conductors may be effected by suitable conductive pins 35, see Fig. 7, tapered to afford tight frictional engagement with the internal wall surfaces of conductors 23, 31.

The interfitting association of core 22 with connector unit 30 precludes accidental exposure of the conductors of the wiring system, particularly in the zone of interconnection thereof, as by settling of the wall structure of a building, irregular wall surface, or the like.

To afford additional protection of such zone of interconnection, and to gage the association of housing 21 with the body 30 to effect visual continuity of the interconnected units, it is desirable to provide the end walls of connector units 30 with lugs 33, 33, which, see Fig. 9, break the joint and prevent possible access to core unit 21 by insertion of a knife blade, wire, or the like, at the line of demarcation between housing 21 and connector 30. Preferably, as is shown in Fig. 8, such lugs 33 are angular, and engage the inner surfaces of the top and side walls of housing 21.

To facilitate manufacturing, connector 30 may be made in two parts, see Figs. 6 and 8, suitably adhesively secured. Wood screws 34, or equivalent, serve to secure the connector 30, and thus the conductor units 20 operatively associated therewith, to a building structure.

In unit 30, any suitable contacts 38, disposed in register with the attachment plug insert openings, see Fig. 9, afford electrical connection of an attachment plug.

Whereas I have described my invention by reference to specific forms thereof, it will be understood that many changes and modifications may be made without departing from the spirit of the invention.

I claim:

1. A unit of a wiring system of seriatim interconnected units, comprising an integral tubular housing, and an electricity conductor unit, including electricity conductors arranged in mutually insulated, uniformly spaced relationship within a common sheath, disposed within said housing on a wall thereof; said wall having a seat to substantially fit the conductor unit to prevent sidewise displacement thereof within said housing; said sheath and said seat having a width less than the wall therein, a wall of said housing opposite said conductor unit in spaced relationship therewith having a flange extending into engagement with said conductor unit to hold the latter on its said wall, said flange-provided wall having spaces above and below said flange.

2. An electric wiring system comprising the combination with a tubular housing element having a channel-formed wall, a conductor unit slidably positioned within said housing on said channel-formed wall, side walls of said channel bearing against side walls of said conductor unit, and a flange projecting inwardly from an opposite wall to bear against said conductor unit, of a connector unit having means to receive an end of said conductor unit and lug means adapted to project into said housing element for engagement with the top and side walls thereof to gage the position of said housing element with respect to said connector unit.

3. In an electric wiring system, the combination with a conductor unit comprising a tubular housing having top and side walls, conductor means within said housing and a flange disposed intermediate said side walls and bearing against said conductor means to position the same adjacent the base of said housing, of a connector unit having conductor means adapted for registry with the conductor means in said conductor unit, walls projecting from a face of said connector unit to extend into the housing of said conductor unit and engage the top and each side wall thereof to position the said conductor and connector units and the conductor means thereof in predetermined axial alignment, and electricity conductor means removably connecting the conductor means of said conductor and connector units.

4. An electric wiring system as recited in claim 2, wherein the lug means of said connector unit are of angle formation disposed on either side of the flange and engage the side walls of said housing element.

5. A conduit for an electrical conductor, said conduit comprising a hollow body, one of the walls of said hollow body being provided with a groove extending substantially continuously longitudinally of said hollow body; electrical conductor means insulatingly disposed in said groove; and means extending substantially continuously longitudinally within said hollow body engaging said electrical conductor means and cooperating with the walls of said groove to secure said electrical conductor means within said groove against lateral displacement, said longitudinally extending means being dimensioned and spaced relative to the inner walls of said hollow body to provide air cooling spaces at and about said electrical conductor means.

6. A conduit for an electrical conductor, said conduit comprising a hollow body, one of the walls of said hollow body being provided with a groove extending substantially continuously longitudinally of said hollow body; electrical conductor means insulatingly disposed in said groove; and means fixed relative to another wall of said hollow body and extending substantially continuously longitudinally within said hollow body engaging said electrical conductor means and cooperating with the walls of said groove to secure said electrical conductor means within said groove against lateral displacement, said longitudinally extending means being dimensioned and spaced relative to the inner walls of said hollow body to provide air cooling spaces at and about said electrical conductor means.

JOSEPH F. O'BRIEN.